July 23, 1957  W. S. FISHER  2,800,123
COMBUSTION CHAMBER
Filed Dec. 28, 1954  2 Sheets-Sheet 1
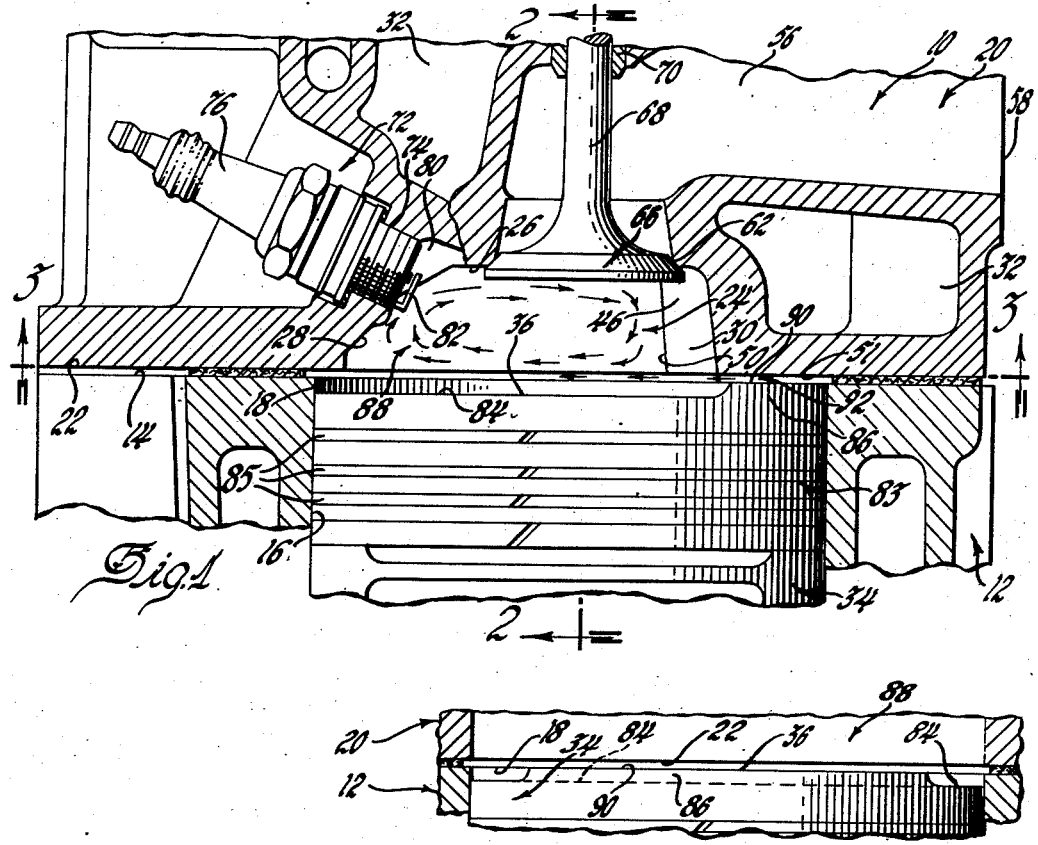
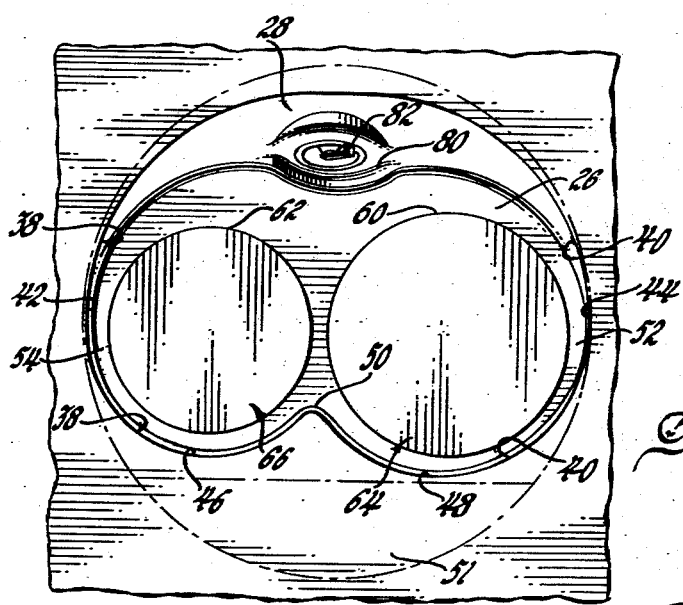
INVENTOR
Walter S. Fisher
BY
L. D. Burch

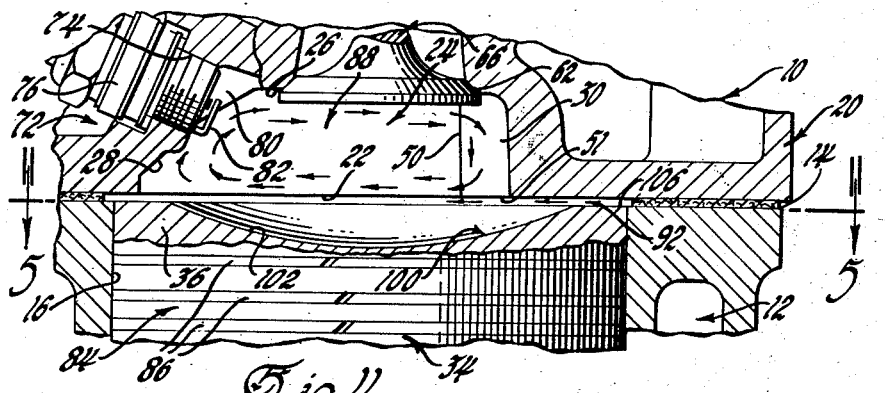

United States Patent Office 2,800,123
Patented July 23, 1957

2,800,123
COMBUSTION CHAMBER

Walter S. Fisher, Birmingham, Mich., assignor to General Motors Corporation, Detroit, Mich., a corporation of Delaware Application December 28, 1954, Serial No. 478,124

13 Claims. (Cl. 123—191)

The present invention relates to internal combustion engines of the so-called "spark ignited" type and more particularly to combustion chambers therefor.

An increase in the compression ratio of a combustion chamber will increase the efficiency of an engine. Accordingly, it is desirable to compress the charge in the combustion chamber as much as possible before the charge is ignited. However, when a gaseous substance such as a combustible charge is compressed, the temperature thereof rises. When a high compression ratio is employed the temperature of the charge may approach the kindling temperature and if there are any hot particles such as an incandescent piece of carbon on the cylinder walls, pre-ignition of the charge may occur. Also as the charge burns and expands, the remaining unburned gases will be heated and compressed even further and the temperature thereof may reach the kindling point and cause them to explode prematurely. In addition, when manufacturing engines that may be placed in widely varying operating conditions, it is desirable to employ a combustion chamber in which the compression ratio may be easily altered without materially altering the operating characteristics of the engine.

It is now proposed to provide a combustion chamber in which the charge may be highly compressed without causing detonation or pre-ignition to occur. This is to be accomplished by providing a combustion chamber having a compact firing zone and a "quench" or "squish" zone. The firing zone contains the majority of the charge and may have a large volume-to-surface ratio. This will permit the majority of the charge to be disposed around the spark plug electrodes and burned very rapidly. The "quench" or "squish" zone may be formed by a pair of substantially parallel plane surfaces on the piston and the cylinder head. When the piston approaches the cylinder head, these two surfaces approach each other and form a small zone having a high surface-to-volume ratio. The large surface area will absorb the heat in the charge and prevent premature burning of the charge. Since the gases in the "quench" or "squish" zone will be compressed faster than in the remaining portions of the chamber, a high velocity blast of gases will be created that will flow into the the firing zone towards the spark plug electrodes. This flow will produce a large amount of turbulence which will thoroughly mix the charge. In addition the flow of the charge against the walls will scour any incandescent particles from the walls of the combustion chamber. The firing zone may be defined by a plurality of walls which are positioned so that the turbulence created by the blast will continue as long as possible. In the present instance the firing zone includes a plane surface recessed inwardly from the face of the head, a curved vertical wall and an inclined wall. The intake and exhaust valves may be disposed in the plane surface while the curved vertical walls may extend around the valves and form an apex that projects between the valves toward the center of the chamber. This apex will partially separate the opposite ends of the chamber from each other to divide the firing zone into an intake end and an exhaust end. The intake and exhaust valves may be disposed in the plane surface in the intake and exhaust ends respectively. This has been found to be especially effective at the lower engine speeds. It has not only been found to be effective to materially decrease the maximum speed at which knock will occur but it has also increased the amount or torque produced at lower speeds.

Figure 1 is a fragmentary cross sectional view of an engine employing a combustion chamber embodying the present invention.

Figure 2 is a fragmentary cross sectional view taken substantially along the plane of line 2—2 in Figure 1.

Figure 3 is a fragmentary cross sectional view taken substantially along the plane of line 3—3 in Figure 1 but for convenience has been rotated 90° clockwise from its normal position.

Figure 4 is a cross sectional view similar to Figure 1 showing a modification of the present invention.

Figure 5 is a cross sectional view taken substantially along the plane of line 5—5 in Figure 4.

Figure 6 is a cross sectional view similar to Figure 1 showing a further modification of the present invention.

Referring to the drawings in more detail, the present invention may be embodied in any suitable engine 10. For the purposes of illustration this engine 10 may include a cylinder block 12 having a plane face 14 on the upper side thereof. One or more cylinders 16 may extend vertically through the block 12 so that the upper end thereof will form a circular opening 18 in the face 14 on the block 12.

A cylinder head 20 may have a plane face 22 thereon that is adapted to mate with the face 14 on the block 12 when the head 20 is secured to the block 12. A cavity 24 may be formed in the face 22 to communicate with at least a portion of the opening 18 formed in the block face 14 by the cylinder 16 to define the walls of a combustion chamber. The cavity 24 may be defined in part by an upper surface 26, an inclined wall 28 and a vertical wall 30.

A plurality of coolant passages 32 may permeate both the cylinder block 12 and the cylinder head 20 so as to communicate with each other and form a coolant jacket that is in heat exchanging relation with the walls of the cylinder 16 and cavity 24. A piston 34 may be reciprocably disposed in the cylinder 16 so that the upper end 36 thereof may also form one of the walls of the combustion chamber.

The upper surface 26 of the cavity 24 may be recessed inwardly from the face 22. In the present instance this surface 26 is substantially a plane and it is disposed substantially parallel to the face 22 on the head 20. The clined wall 28 is oblique to the face 22 of the head 20 and extends upwardly therefrom to join the upper surface 26 and thereby form one side of the cavity 24. In the present instance this wall 28 is substantially a plane surface.

The vertical wall 30 may be disposed substantially normal to the face 22 of the cylinder head 20. Both walls 28 and 30 may extend upwardly until they intersect the upper surface 26. The substantially vertical wall 30 may include a pair of arcuate portions 38 and 40. Each of these arcuate portions 38 and 40 may include an end segment 42 and 44 and a side segment 46 and 48. The two end segments 42 and 44 may extend around the opposite ends of the cavity 24 to form the ends thereof. In the present instance these segments 42 and 44 are spaced to place the ends in alignment with the diametrically opposite sides of the cylinder. These segments 42 and 44 may also extend around the cavity 24 to intersect and blend into the inclined wall 28 so as to form a smooth continuous surface. The side segments 46 and 48 which make up the remainder of the vertical wall 30 are preferably a continuation of the end segments 42 and 44 and they extend around the side of the cavity 24 to intersect each other. This will form an apex 50 that projects inwardly towards the center of the cavity 24. Although the length of the cavity 24 may equal the diameter of the cylinder 16, the opposite sides are preferably closer together. Thus the apex 50 will result in a portion of the cylinder head face 22 extending across the opening 18 and exposing a portion 51 of the face 22 to the cylinder 16. At the same time the apex 50 will partially separate the opposite ends of the cavity to divide it into an intake end 52 and an exhaust end 54.

Intake and exhaust passages 56 may extend through the cylinder head 20 with the outer ends thereof forming ports 58 in the outer side of the head 20. The opposite or inner ends of the passages 56 may form valve seats 60 and 62 in the surface 26. The valve seats 60 and 62 are preferably disposed on the opposite sides of the apex 50 so the intake valve seat 60 will be in the intake end 52 of the chamber and the exhaust valve seat 62 will be in the exhaust end 54.

A poppet valve 64 and 66 may be disposed in each of the seats for controlling the flow of gases into and out of the combustion chamber. The valves 64 and 66 may have stems 68 that project inwardly into the valve guides 70; thus the valves 64 and 66 may be moved axially onto and off of the valve seats 60 and 62 by any means suitable for timing the flow of gases into and out of the combustion chamber. Since there is an exhaust pressure to blow the exhaust gases out of the cavity and only atmospheric pressure to force the charge into the chamber, the intake valve 64 is preferably as large as possible to improve the volumetric efficiency. As a result the various parts of the intake end 52 such as the intake valve 64, valve seat 60 and the end walls, etc. may be larger than the corresponding parts in the exhaust end 54 of the chamber.

A passage 72 may extend obliquely through the cylinder head 20 to communicate with the cavity 24. The outer end 74 of this passage 72 may be enlarged to form a spark plug housing while the reduced center portion may be threaded to receive the threaded end of the spark plug 76. The inner end 78 of the passage 72 may form an opening in the inclined wall to provide a pocket 80 around the spark plug electrodes 82. Although the exact location of these electrodes 82 may vary, in the present installation they are disposed opposite the apex 50 and slightly closer to the exhaust end 54 of the chamber.

The piston 34 may be reciprocably disposed in the cylinder 16 and drivingly connected to the rotating crankshaft by means of a connecting rod. The upper end 36 of the piston 34 may have a ring belt 83 that includes a plurality of ring receiving grooves. Piston rings 85 may be disposed in these grooves to slidably engage the cylinder walls and seal the clearance space between the piston 34 and cylinder 16. The upper end 36 of the piston 34 may have a surface that is substantially normal to the axis of the cylinder 16 and is adapted to cooperate with the cavity 24 to define the combustion chamber. In the present instance this end 36 is a plane surface 84 having a step or raised portion 86 on one side thereof. The plane surface 84 may be disposed below the cavity 24 so as to register therewith. This will form a firing zone 88 containing the majority of the charge present in the combustion chamber. This firing zone 88 is concentrated about the spark plug electrodes 82 and it is compact enough to have a large volume-to-surface ratio.

The step 86 may have a plane surface 90 which forms a chord. This chord may be disposed on one side of the piston 34 to register with the exposed surface 51 on the cylinder head face 22. Thus when the piston 34 is at or near top dead center, a "quench" or "squish" zone 92 will be formed that has a large surface-to-volume ratio. This zone 92 is preferably diametrically disposed from the spark plug electrodes 82. When the piston 34 rises toward top dead center, the gases in the space between the piston step 86 and the exposed portion 51 of the cylinder head 20 will be more rapidly compressed than the gases in the remaining portion of the chamber. These more highly compressed gases will thus form a blast which will be discharged inwardly into the firing zone 88. The gases in this blast flow inwardly and they will be directed towards the inclined wall 28 so as to be deflected upwardly across the spark plug electrodes 82. At the gases strike the apex 50 they will be divided into the opposite ends 52 and 54 so that a swirl of gases will be created in each end of the chamber.

This turbulence flow will cause a thorough mixing of the air and fuel particles with a resultant uniform burning of the charge. At the same time the turbulent flowing of the gases against and across the walls of the combustion chamber will also cause any carbon particles or other deposits on the combustion chamber walls to be scoured therefrom. This will greatly reduce likelihood of any incandescent particles collecting on the walls which in turn will reduce the probability of pre-ignition occurring.

During the operation of the engine 10 the piston 34 will compress the charge as it approaches top dead center. When this charge is highly compressed an electrical discharge will occur between the electrodes 82. Thus the charge will be ignited in the immediate vicinity of the electrodes. The flame front will then travel from the electrodes towards the more remote regions of the combustion chamber. Since the majority of the charge is in a firing zone 88 having a large volume-to-surface ratio, the major portion of the charge may be burned very rapidly. As these gases burn and expand the remaining unburned or end gases will be compressed and heated until the temperature thereof approaches the kindling temperature. However in the present combustion chamber, these gases will be disposed in the "quench" or "squish" zone 92 which has a large surface-to-volume ratio. Thus as the end gases are compressed and heated by movement of the piston and the original burning of the gases in the firing zone 88, the surfaces 51 and 90 on the cylinder head 20 and the piston 34 will absorb a large amount of heat out of the end gases. This will prevent the temperature of these unburned gases approaching the kindling point. Thus a premature burning of the charge will be prevented and all of the gases will be burned as a result of the orderly advance of the flame front throughout the entire combustion chamber.

A modification of the present invention is shown in Figures 4 and 5. This embodiment like the first embodiment is incorporated in an engine 10 having a cylinder block 12 with a plane face 14 thereon and a cylinder head 20 having a plane face 22 that is adapted to seat on the first face 14. The cylinder head 20 may have a cavity that is positioned to register with an opening 18 in the block face 14 formed by a cylinder 16 extending therethrough. The cavity 24 is the same as in the first embodiment and it includes an inclined side wall 28, a curved vertical wall 30 and a substantially plane surface 26 which are all disposed in substantially the same relationship as in the first embodiment. Intake and exhaust valves 64 and 66 may be disposed in intake and exhaust valve seats 60 and 62 formed in the plane surface 26. The curved vertical wall 30 may form an apex 50 that extends inwardly between the valves 64 and 66 to partially separate the opposite ends 52 and 54 of the chamber 24 and also to expose a portion 51 of the cylinder head face 22 to the open end of the cylinder 16. A spark plug 76 may be disposed in a passage 72 extending obliquely through the head and forming an opening 80 in the inclined wall 28.

A piston 34 may be reciprocably disposed in the cylinder 16 and drivingly connected to the crankshaft by a piston rod. The upper end 36 of the piston 34 may have a ring belt 84 that receives a plurality of piston rings 86 that slidably engage the cylinder wall 16 for sealing the clearance between the piston 34 and the cylinder 16.

The surface 100 formed by the upper end 36 of the piston 34 includes a depressed center portion 102 and a peripheral rim 104. The depressed portion 102 may be positioned to communicate with the cavity 24 to form a compact firing zone 88 having a large volume-to-surface ratio. The rim 104 may extend around the depressed portion 102 and have a plane surface 106 at least a portion of which is positioned to register with the exposed portion 51 of the cylinder head face 22. The rim 104 and the exposed face 51 will form a "quench" or "squish" zone 92 when the piston 34 approaches top dead center. This zone 92 will function similar to that in the first embodiment in that a blast of gases will be directed into the firing zone 88. This blast will flow towards the inclined wall 28 and up toward the apex 50 where it will divide into separate swirls in the intake and exhaust ends 52 and 54 of the chamber. In addition to creating a turbulent blast of gases into the firing zone 88 the mating surfaces 106 and 51 on the piston 34 and the head 20 will form a "quench" zone 92 having a large surface-to-volume ratio that will tend to absorb large quantities of heat from the unburned end gases. Thus the chamber in this embodiment will function substantially the same as in the first embodiment.

Another modification of the present invention is illustrated in Figure 6. This embodiment like the first two is incorporated in an engine 10 having a cylinder block 12 with a plane face 14 thereon and a cylinder head 20 having a plane face 22 that is adapted to seat on the first face 14. The cylinder head 20 may have a cavity 24 positioned to register with an opening 18 in the block face 14 formed by a cylinder 16 extending therethrough. The cavity 24 is the same as in the other embodiments and it includes an inclined wall 28, a curved vertical wall 30 and a substantially plane surface 26 all of which may be disposed in substantially the same relationship as in the other embodiments. Intake and exhaust valves 64 may be disposed in intake and exhaust valve seats 60 formed in the plane surface 26. The curved vertical wall 30 may form an apex 50 that extends inwardly between the valves 64 to partially separate the opposite ends of the chamber and also to expose a portion 51 of the cylinder head face 22 to the open end 18 of the cylinder 16. A spark plug 76 may be disposed in a passage 72 that extends obliquely through the head 20 to form an opening 80 in the inclined wall 28 and place the electrodes 82 opposite the apex 50.

A piston 34 may be reciprocably disposed in the cylinder 16 and drivingly connected to the crankshaft by a piston rod. The upper end 36 of the piston 34 may have a ring belt 84 that receives a plurality of piston rings 86 that slidably engage the cylinder walls for sealing the clearance space between the piston 34 and the cylinder 16.

The surface formed by the upper end 36 of the piston 34 may be a plane surface 110 that is normal to the axis of the cylinder 16. This plane surface 110 will register with the cavity 24 to form a firing zone 112 having a large surface-to-volume ratio. When the piston 34 approaches top dead center this plane surface will be adjacent all of the exposed portions 51 of the head face 22. Thus the maximum amount of "squish" and "quench" zone 114 will be formed and there will be the maximum amount of turbulent flow into the firing zone and the maximum amount of heat absorption from the end gases.

It may be seen that the present combustion chamber is particularly adapted to be used with an assortment of pistons in which the upper ends have different surfaces. By varying the shape of the upper end of the piston, the size of the firing zone and the shape thereof may be varied enough to alter the compression ratio in the combustion chamber. Even though the compression ratio may be easily varied, the operational characteristics of the engine will remain substantially the same. It should be noted that as the compression ratio is increased by raising more of the surface of the piston to a higher elevation, the amount of surface forming the "quench" and "squish" zone will be greatly increased. Thus any tendency towards detonation which will be produced by an increase in the compression ratio will tend to be compensated for by the accompanying increase in the cooling effect produced by the "quench" zone.

Various changes and modifications of the embodiments of the invention described herein may be made by those skilled in the art without departing from the spirit and principles of the invention.

What is claimed is:

1. A cylinder head having a plane face adapted to abut a similar face on a cylinder block when secured thereto, said head having a cavity in said face positioned to register with an opening formed by a cylinder extending through said block, said cavity being defined by a generally plane surface recessed inwardly from the face of said head, an inclined wall positioned oblique to said face to form one side of said cavity, a wall forming the remaining sides of said cavity, said second wall having curved portions which form the opposite ends of the cavity and which intersect each other to form an apex that projects towards the center of said cavity, the portion of said head face exposed to said cylinder and being adapted to mate with a plane surface on the upper end of a piston reciprocably disposed within said cylinder.

2. A cylinder head having a plane face adapted to abut a similar face on a cylinder block when said head is secured thereto, said head having a cavity in said face positioned to register with an opening formed in said second face by a cylinder extending through said block, said cavity being defined by a generally plane surface recessed inwardly from the face of said head, an inclined wall disposed oblique to said face to form one side of said cavity, a wall having curved portions which form the opposite ends of the cavity and which intersect each other to form an apex that projects towards the center of said cavity, intake and exhaust valve seats formed in said plane surface, and a spark plug socket formed in said inclined wall oblique thereto to form a shielding pocket for receiving spark plug electrodes and retaining them in substantial alignment with the surface of said inclined wall.

3. A cylinder head having a plane face adapted to abut a similar face on a cylinder block when said head is secured thereto, said head having a cavity in said face positioned to register with an opening in said second face formed by a cylinder extending through said block, said cavity being defined by a substantially plane surface disposed substantially parallel to the face of said head, an inclined wall disposed oblique to said face to form one side of said cavity, a wall having curved portions which form the opposite ends of the cavity, the distance between said ends being substantially equal to the diameter of said opening, said curved portions intersecting each other to form an apex that projects towards the center of said cavity, intake and exhaust valve seats formed in said plane surface on the opposite sides of said apex and a spark plug socket formed in said inclined wall to open into said cavity between said valves to position spark plug electrodes in substantial alignment with the surface of the inclined wall.

4. A cylinder head having a plane face adapted to abut a similar face on a cylinder block when said head is secured thereto, said head having a cavity in said face positioned to register with an opening formed in said second face by a cylinder extending through said block, said cavity being defined by a generally plane surface recessed inwardly from the face of said head, an inclined wall disposed oblique to said face to form one side of said cavity, a spark plug socket formed in said inclined wall opening into said cavity, a wall normal to said face and having curved portions that form the remaining sides of said cavity, said curved portions having segments which join with said inclined wall and form the opposite ends of said cavity, said curved portions also including segments which intersect each other to form an apex that projects towards the center of said cavity, the portion of the cylinder head face bounded by the cylinder wall and the intersection of said normal wall and said face forming an exposed portion diametrically opposite said spark plug exposed to said cylinder, intake and exhaust valve seats formed in said plane surface on the opposite sides of said apex, a spark plug socket formed in said inclined wall, and a piston reciprocably disposed in said cylinder and having a plane surface thereon positioned to register with said exposed portion of said cylinder head face.

5. A cylinder head having a plane face adapted to abut a similar face on a cylinder block when said head is secured thereto, said head having a cavity in said face positioned to register with an opening formed in said second face by a cylinder extending through said block, said cavity being defined by a generally plane surface disposed substantially parallel to the face of said head, an inclined wall disposed oblique to said face to form one side of said cavity, a wall normal to said face and having curved portions that form the remaining sides of said cavity, said curved portions having segments which join with said inclined wall and form the opposite ends of said cavity, said curved portions also including segments which intersect each other to form an apex that projects towards the center of said cavity so that a portion of the cylinder head face will be exposed to the open end of said cylinder, intake and exhaust valve seats formed in said plane surface on the opposite sides of said apex, a spark plug socket formed in said inclined wall, and a piston reciprocably disposed in said cylinder and having a raised portion on one end that includes a plane surface positioned to register with said exposed portion of said cylinder head face.

6. A cylinder head having a plane face adapted to abut a similar face on a cylinder block when said head is secured thereto, said head having a cavity in said face positioned to register with an opening formed in said second face by a cylinder extending through said block, said cavity being defined by a generally plane surface disposed substantially parallel to the face of said head, an inclined wall disposed oblique to said face to form one side of said cavity, a wall normal to said face and having curved portions that form the remaining sides of said cavity, said curved portions having segments which join with said inclined wall and form the opposite ends of said cavity, said curved portions also including segments which intersect each other to form an apex that projects towards the center of said cavity so that a portion of the cylinder head face will be exposed to the open end of said cylinder, intake and exhaust valve seats formed in said plane surface on the opposite sides of said apex, a spark plug socket formed in said inclined wall, and a piston reciprocably disposed in said cylinder, one end of said piston having a depression in the center thereof positioned to communicate with said cavity and a peripheral rim that extends around said depression and forms a plane surface positioned to register with said exposed portion of said face.

7. In an engine the combination of a cylinder block having a cylinder extending therethrough and forming an opening in a face on said cylinder block, a cylinder head having a plane face positioned to abut said first face when said head is secured to said block, said head having a cavity in said second face positioned to register with said opening formed by said cylinder, said cavity being defined by a substantially plane surface disposed substantially parallel to the face of said head, an inclined wall disposed oblique to said face to form one side of said cavity, a wall disposed substantially normal to said face and having a pair of curved portions, each of said curved portions including segments which join with said inclined wall and form the opposite ends of the cavity, the distance between said ends being substantially equal to the diameter of said opening to position said ends coincident with the sides of said cylinder, said curved portions also including segments which intersect each other to form an apex that projects towards the center of said cavity to expose a portion of said cylinder head face to the open end of said cylinder, intake and exhaust valve seats formed in said plane surface on the opposite sides of said apex, a spark plug socket formed in said inclined wall substantially opposite said apex, and a piston reciprocably disposed in said cylinder and having a plane surface thereon positioned substantially diametrically opposite from said spark plug to register with said exposed portion of said face.

8. In an engine the combination of a cylinder block having a cylinder extending therethrough and forming an opening in a face on said cylinder block, a cylinder head having a face positioned to abut said first face when said head is secured to said block, said head having a cavity in said second face positioned to register with said opening formed by said cylinder, said cavity being defined by a substantially plane surface disposed substantially parallel to the face of said head, an inclined wall disposed oblique to said face to form one side of said cavity, a wall disposed substantially normal to said face and having a pair of curved portions, each of said curved portions including segments which join with said inclined wall and form the opposite ends of the cavity, the distance between said ends being substantially equal to the diameter of said opening to position said ends coincident with the sides of said cylinder, said curved portions also including segments which intersect each other to form an apex that projects towards the center of said cavity to expose a portion of said cylinder head face to the open end of said cylinder, intake and exhaust valve seats formed in said plane surface on the opposite sides of said apex, a spark plug socket formed in said inclined wall substantially opposite to said apex, and a piston reciprocably disposed in said cylinder with one end of said piston having a raised portion positioned to register with said exposed portion of said face.

9. In an engine the combination of a cylinder block having a cylinder extending therethrough and forming an opening in a face on said cylinder block, a cylinder head having a face positioned to abut said first face when said head is secured to said block, said head having a cavity in said second face positioned to register with said opening formed by said cylinder, said cavity being defined by a substantially plane surface disposed substantially parallel to the face of said head, an inclined wall disposed oblique to said face to form one side of said cavity, a wall disposed substantially normal to said face and having a pair of curved portions, each of said curved portions including segments which join with said inclined wall and form the opposite ends of the cavity, the distance between said ends being substantially equal to the diameter of said opening to position said ends coincident with the sides of said cylinder, said curved portions also including segments which intersect each other to form an apex that projects towards the center of said cavity to expose a portion of said cylinder head face to the open end of said cylinder, intake and exhaust valve seats formed in said plane surface on the opposite sides of said apex, a spark plug socket formed in said inclined wall substantially opposite to said apex, and a piston reciprocably disposed in said cylinder with one end of said piston having a depression in the center thereof positioned to communicate with said cavity and a peripheral rim which extends around said depression to form a plane surface that registers with said exposed portion of said face.

10. A cylinder head having a plane face adapted to abut a similar face on a cylinder block when said head is secured thereto, said head having a cavity in said face positioned to register with an opening formed by a cylinder extending through said block, said cavity being defined by a generally plane surface disposed substantially parallel to the face of said head, an inclined wall disposed oblique to said face to form one side of said cavity, a wall substantially normal to said face and having a pair of curved portions, one of said portions cooperating with a part of said inclined wall to form an intake end of said cavity, the other of said curved portions cooperating with the remaining part of said inclined wall to form an exhaust end of said cavity, each of said curved portions including a segment which forms end walls of said cavity which are so spaced apart as to be coextensive with the cylinder walls, said curved portions also including segments which intersect each other to form an apex that projects towards the center of said cavity and partially separates said intake and exhaust ends, an intake valve seat formed in said plane surface in said intake end, an exhaust valve seat formed in said plane surface in said exhaust end, and a spark plug socket formed in said inclined wall to form a shielding pocket with the surface thereof substantially normal to the axis of said socket for positioning the spark plug electrodes in alignment with the surface of said inclined wall.

11. In an engine the combination of a cylinder block having a cylinder extending therethrough and forming an opening in a plane face on said cylinder block, a cylinder head having a plane face adapted to abut said face on said cylinder block when said head is secured thereto, said head having a cavity in said face positioned to register with said opening, said cavity being defined by a generally plane surface disposed substantially parallel to the face of said head, an inclined wall disposed oblique to said face to form one side of said cavity, a wall substantially normal to said face and having a pair of curved portions, one of said portions cooperating with a part of said inclined wall to form an intake end of said cavity, the other of said curved portions cooperating with the remaining part of said inclined wall to form an exhaust end of said cavity, each of said curved portions including a segment which forms the end walls of said cavity and which are spaced apart so that the end walls will be coextensive with the cylinder walls, said curved portions also including segments which intersect each other to form an apex that projects toward the center of said cavity to partially separate said intake and exhaust ends and expose at least a portion of said head face to the open end of said cylinder, an intake valve seat formed in said plane surface in said intake end, an exhaust valve seat formed in said plane surface in said exhaust end, a spark plug socket formed in said inclined wall, and a piston disposed in said cylinder and having a plane surface on at least a portion of one end thereof diametrically opposite said spark plug positioned to register with said exposed face.

12. In an engine the combination of a cylinder block having a cylinder extending therethrough and forming an opening in a plane face on said cylinder block, a cylinder head having a plane face adapted to abut said face on said cylinder block when said head is secured thereto, said head having a cavity in said face positioned to register with said opening, said cavity being defined by a generally plane surface disposed substantially parallel to the face of said head, an inclined wall disposed oblique to said face to form one side of said cavity, a wall substantially normal to said face and having a pair of curved portions, one of said portions cooperating with a part of said inclined wall to form an intake end of said cavity, the other end of said curved portions cooperating with the remaining part of said inclined wall to form an exhaust end of said cavity, the intake end of said cavity being larger than the exhaust end of said cavity, each of said curved portions including a segment which forms an end wall of said cavity, said end walls being spaced to be coextensive with the cylinder wall, said curved portions also including segments which intersect each other to form an apex that projects towards the center of said cavity to partially separate said intake and exhaust ends and expose at least a portion of said head face to the open end of said cylinder, an intake valve seat formed in said plane surface in said intake end, an exhaust valve seat formed in said plane surface in said exhaust end, a spark plug socket formed in said inclined wall, and a piston disposed in said cylinder and having a raised portion forming a plane surface positioned to register with said exposed face.

13. In an engine the combination of a cylinder block having a cylinder extending therethrough and forming an opening in a plane face on said cylinder block, a cylinder head having a plane face adapted to abut said face on said cylinder block when said head is secured thereto, said head having a cavity in said face positioned to register with said opening, said cavity being defined by a generally plane surface disposed substantially parallel to the face of said head, an inclined wall disposed oblique to said face to form one side of said cavity, a wall substantially normal to said face and having a pair of curved portions, one of said portions cooperating with a part of said inclined wall to form an intake end of said cavity, the other end of said curved portions cooperating with the remaining part of said inclined wall to form an exhaust end of said cavity, the intake end of said cavity being larger than the exhaust end of said cavity, each of said curved portions including a segment which forms an end wall of said cavity, said end walls being spaced to be coextensive with the cylinder wall, said curved portions also including segments which intersect each other to form an apex that projects towards the center of said cavity to partially separate said intake and exhaust ends and expose at least a portion of said head face to the open end of said cylinder, an intake valve seat formed in said plane surface in said intake end, an exhaust valve seat formed in said plane surface in said exhaust end, a spark plug socket formed in said inclined wall, and a piston reciprocably disposed in said cylinder, one end of said piston having a depression in the center thereof positioned to communicate with said cavity and a peripheral rim that extends around said depression and forms a plane surface positioned to register with said exposed portion of said face.

References Cited in the file of this patent

UNITED STATES PATENTS

| | | |
|---|---|---|
| 2,214,941 | Taub | Sept. 17, 1940 |

FOREIGN PATENTS

| | | |
|---|---|---|
| 301,797 | Italy | Oct. 12, 1932 |
| 328,405 | Italy | Aug. 8, 1935 |
| 134,542 | Germany | Apr. 15, 1933 |
| 604,997 | Great Britain | July 14, 1948 |
| 640,734 | Great Britain | July 26, 1950 |